United States Patent
Lee et al.

(10) Patent No.: US 12,450,133 B2
(45) Date of Patent: Oct. 21, 2025

(54) ELECTRONIC DEVICE FOR RECOVERING FILE AND OPERATION METHOD OF ELECTRONIC DEVICE

(71) Applicant: SAMSUNG ELECTRONICS CO., LTD., Suwon-si (KR)

(72) Inventors: Haewook Lee, Suwon-si (KR); Hyunjoon Kim, Suwon-si (KR); Kwanhee Jeong, Suwon-si (KR); Hyojong Kim, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 0 days.

(21) Appl. No.: 18/618,711

(22) Filed: Mar. 27, 2024

(65) Prior Publication Data

US 2024/0241799 A1    Jul. 18, 2024

Related U.S. Application Data

(63) Continuation of application No. PCT/KR2022/017768, filed on Nov. 11, 2022.

(30) Foreign Application Priority Data

Nov. 12, 2021  (KR) .................. 10-2021-0156037

(51) Int. Cl.
G06F 11/14    (2006.01)
(52) U.S. Cl.
CPC ............................ *G06F 11/1469* (2013.01)
(58) Field of Classification Search
None
See application file for complete search history.

(56) References Cited

U.S. PATENT DOCUMENTS 6,519,733 B1   2/2003 Har et al.
6,591,376 B1   7/2003 Vanrooven et al.
(Continued)

FOREIGN PATENT DOCUMENTS

CN    105279047 A    1/2016
CN    111209143 A    5/2020
(Continued)

OTHER PUBLICATIONS

International Search Report for International Application No. PCT/KR2022/017768; International Filing Date Nov. 11, 2022; International Search Report Mail Date Feb. 17, 2023; 4 Pages.
(Continued)

*Primary Examiner* — Eddy Cheung
(74) *Attorney, Agent, or Firm* — CANTOR COLBURN LLP

(57) ABSTRACT

An electronic device may comprise memory for storing a file obtained by compressing a file including at least one module as a package, and a processor, wherein the processor: generates an uncompressed file by decompressing the compressed file; stores the generated uncompressed file in the memory; during booting of the electronic device, identifies whether deformation has occurred in the uncompressed file; and in response to the occurrence of deformation in the uncompressed file, performs a recovery operation for the uncompressed file. A method comprises: generating an uncompressed file by decompressing a file obtained by compressing a file including at least one module as a package; storing the generated uncompressed file in a memory; during booting of the electronic device, identifying whether deformation has occurred in the uncompressed file; and in response to the occurrence of deformation in the uncompressed file, performing a recovery operation for the uncompressed file.

12 Claims, 11 Drawing Sheets

(56) References Cited

U.S. PATENT DOCUMENTS

| | | | |
|---|---|---|---|
| 7,594,136 | B2 | 9/2009 | Kerner et al. |
| 7,694,191 | B1 | 4/2010 | Bono et al. |
| 8,122,234 | B1 | 2/2012 | Orr |
| 11,550,480 | B2 | 1/2023 | Stöttinger et al. |
| 2008/0114950 | A1 | 5/2008 | Graham |
| 2009/0158086 | A1 | 6/2009 | Kwon |
| 2017/0139786 | A1* | 5/2017 | Simon ................. G06F 11/1469 |
| 2018/0322012 | A1* | 11/2018 | Sharma ................. G06F 21/572 |

FOREIGN PATENT DOCUMENTS

| | | |
|---|---|---|
| CN | 113296781 A | 8/2021 |
| CN | 113505014 A | 10/2021 |
| KR | 20060097329 A | 9/2006 |
| KR | 100652662 B1 | 12/2006 |
| KR | 20140000369 A | 1/2014 |
| KR | 101369251 B1 | 3/2014 |
| KR | 101727860 B1 | 4/2017 |
| KR | 102142905 B1 | 8/2020 |
| WO | 2020251542 A1 | 12/2020 |

OTHER PUBLICATIONS

NAVER Corp.; blog, "Bravo !! My Life"; NAVER 1784, 95, Jeongjail-ro, Bundang-gu, Seongnam-si, Gyeonggi-do, Republic of Korea; Published Online: Dec. 31, 2016; 5 Pages. URL: https://m.blog.naver.com/PostView.naver?blogId=mind75952&logNo=220899580367&referrerCode=0.

Extended European Search Report Issued In EP Application No. 22893272.9-1203, Mail Date Nov. 13, 2024, 12 Pages.

* cited by examiner

ELECTRONIC DEVICE FOR RECOVERING FILE AND OPERATION METHOD OF ELECTRONIC DEVICE

CROSS-REFERENCE TO RELATED APPLICATION

This application is a continuation application, claiming priority under § 365(c), of International Application No. PCT/KR2022/017768 filed on Nov. 11, 2022, which is based on and claims the benefit of Korean patent application number 10-2021-0156037 filed on Nov. 12, 2021, in the Korean Intellectual Property Office, the disclosures of which are incorporated by reference herein in their entireties.

TECHNICAL FIELD

Various embodiments disclosed in this document relate to an electronic device and a method of operating the electronic device for recovering a file. Specifically, various embodiments disclosed in this document relate to an electronic device and a method of operating the electronic device for recovering a file that constitutes at least one module included in a framework into a package.

BACKGROUND ART

Android Pony Express (APEX) is a method of constituting and using some modules included in a framework in the form of a single package. One APEX file composed of a package has an "apex" extension. Main files included in the APEX may be main modules of the framework and include execution files such as "executable", native libraries such as "so", Java libraries such as "jar", and various other data files.

When an APEX method is used, major modules of the framework may be easily updated. A method of updating the APEX may correspond to a method of updating an application (apk). Although there are differences in a specific operation process of the update, the main advantage and purpose of the APEX method may be that major modules of the framework may be updated through a store app (e.g., play store).

Compressed APEX (CAPEX) is a method of compressing the existing apex file once more. The CAPEX was introduced for the purpose of reducing the size of the apex file. APEXD is a native process for apex files and may be responsible for authenticating, installing, and uninstalling APEX files. The APEXD may decompress the CAPEX to create APEX and mount modules within the APEX.

An original apex file may be stored in a user data area where read/write is possible. Unlike apex files in a read only area, a file corruption phenomenon may occur in the user data area. The APEXD may use 'dm-verity' logic in order to identify file corruption in apex files. Also, 'dm-verity' may be logic performed by the kernel in order to identify the integrity and consistency of files stored in the user data area.

A PackageManagerService (PKMS) module may be a service module of a framework that manages installed applications (apk). In order to identify a normal operation of the apk, the PKMS module may perform a check on a signature of the apk file while scanning all apk files stored in a terminal during a framework initialization process. For example, the PKMS module may identify whether a previously verified signature value matches a signature extracted from the apk file. In order to identify a normal operation of the apk file (hereinafter, apks-in-apex) existing within an apex module, the PKMS may perform a check on the signature of the apk file included in the mounted apex module.

DISCLOSURE OF INVENTION

Technical Problem

In the case that corruption occurs in an original apex file (decompressed apex) in which APEXD decompresses from a capex file, panic (dmv corrupt) may occur by 'dm-verity' logic of a kernel. In the case that the original apex file is corrupted, panic (or issue) due to 'dmv-corrupt' may be repeated, and a terminal may not be booted and become unusable.

The PKMS may scan apks-in-apex files to perform a signature check. The PKMS may generate an exception and perform platform restart corresponding to a difference between a previously verified signature value and a signature extracted from an apks-in-apex file. In the case that a signature of the apks-in-apex file is in a damage state, platform restart is repeated by an exception, and the terminal may not be booted and become unusable.

Solution to Problem

Various embodiments disclosed in this document may provide an electronic device that, in the case that corruption occurs in an apex file, identifies corruption and performs a recovery operation of the corrupted apex file.

For example, in the case that kernel panic (e.g., issue) occurs in an apex file, an electronic device according to various embodiments may identify a panic message stored by a kernel in a designated node to recover an apex file.

For example, an electronic device according to various embodiments may recover the apex file in the case that a signature check of the PKMS is mismatched for the apex file.

For example, the electronic device according to various embodiments may delete an original uncompressed apex file for a corrupted apex file and decompress again the compressed apex file to restore the apex file.

Technical problems to be achieved in this document are not limited to the above-described technical problems, and other technical problems not described may be clearly understood by those of ordinary skill in the art to which the disclosure belongs from the description below.

According to various embodiments disclosed in this document, an electronic device may include memory configured to store a compressed file of a file that constitutes at least one module into a package; and a processor, wherein the processor may be configured to decompress the compressed file to create an uncompressed file, and store the created uncompressed file in the memory, to identify whether corruption has occurred in the uncompressed file while booting the electronic device, and to perform a recovery operation of the uncompressed file corresponding to corruption occurring in the uncompressed file.

According to various embodiments disclosed in this document, a method of operating an electronic device may include creating an uncompressed file by decompressing a compressed file of a file that constitutes at least one module into a package; storing the created uncompressed file in a memory; identifying whether corruption has occurred in the uncompressed file while booting the electronic device; and performing a recovery operation of the uncompressed file corresponding to corruption occurring in the uncompressed file.

Advantageous Effects of Invention

According to various embodiments, an electronic device can identify an apex file in which a problem has occurred.

According to various embodiments, an electronic device can recover an apex file in which a problem has occurred.

According to various embodiments, even if a problem has occurred in an apex file, the electronic device can recover the problem and be booted normally without entering a kernel panic state.

According to various embodiments, even if a problem has occurred in an apex file, the electronic device can recover the problem and be booted normally without entering a platform restart state.

BRIEF DESCRIPTION OF DRAWINGS

In relation to the description of the drawings, identical or similar reference numerals may be used for identical or similar components.

MODE FOR THE INVENTION

Figure 1:
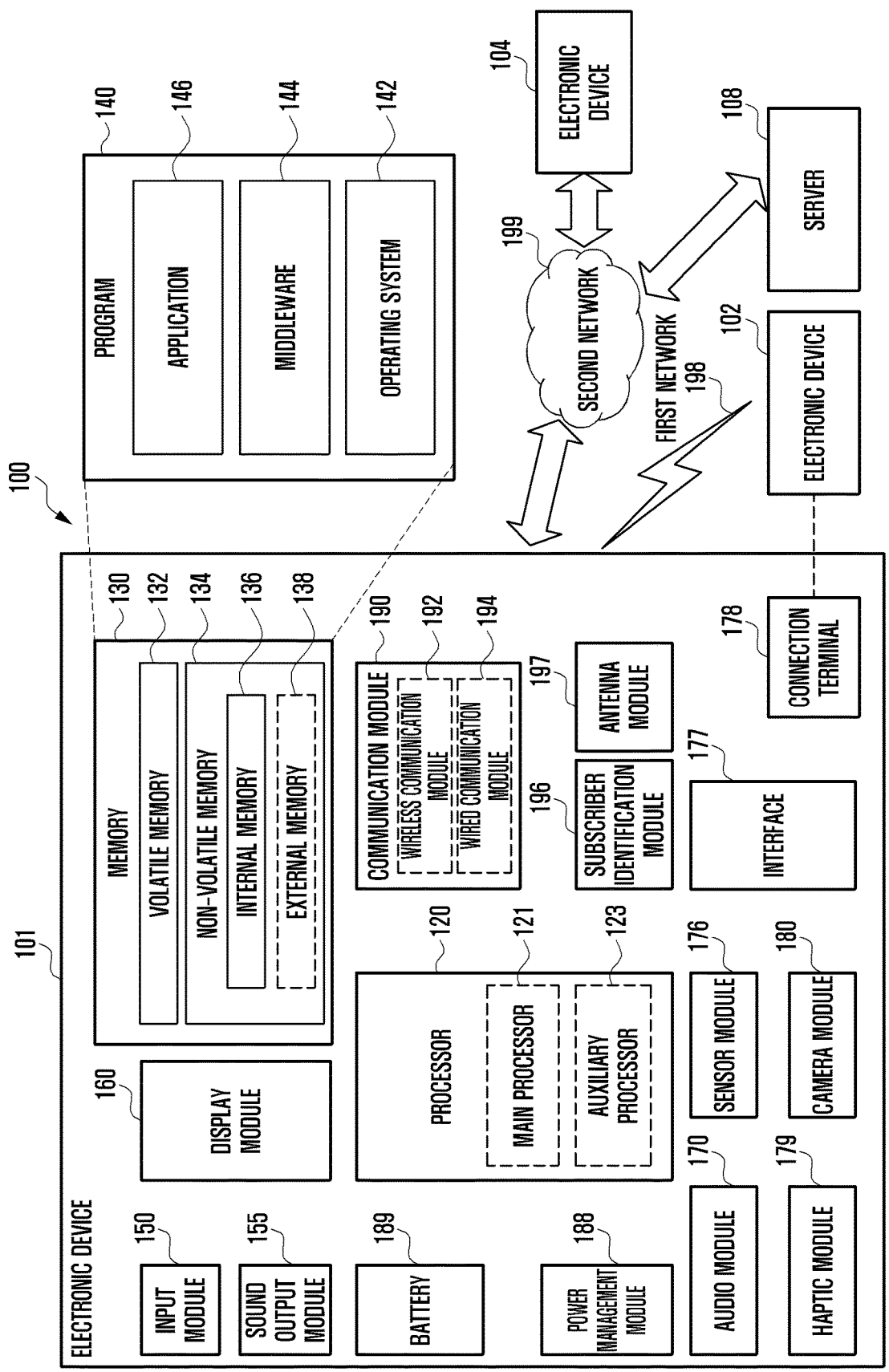
FIG. 1 is a block diagram illustrating an electronic device in a network environment according to various embodiments.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connection terminal 178, a haptic module 179, a camera module 180, a power management module 188, a battery 189, a communication module 190, a subscriber identification module (SIM) 196, or an antenna module 197. In some embodiments, at least one of the components (e.g., the connection terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134. The non-volatile memory may include at least one of an internal memory 136 and an external memory 138.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., the electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high-definition multimedia interface (HDMI), a universal serial bus (USB) interface, a secure digital (SD) card interface, or an audio interface.

The connection terminal 178 may include a connector via which the electronic device 101 may be physically connected with the external electronic device (e.g., the electronic device 102). According to an embodiment, the connection terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large-scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 gigabits per second (Gbps) or more) for implementing eMBB, loss coverage (e.g., 164 decibels (dB) or less) for implementing mMTC, or U-plane latency (e.g., 0.5 milliseconds (ms) or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form an mmWave antenna module. According to an embodiment, the mmWave antenna module may include a printed circuit board, an RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices (e.g. electronic devices 102 and 104 or the server 108). For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra-low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
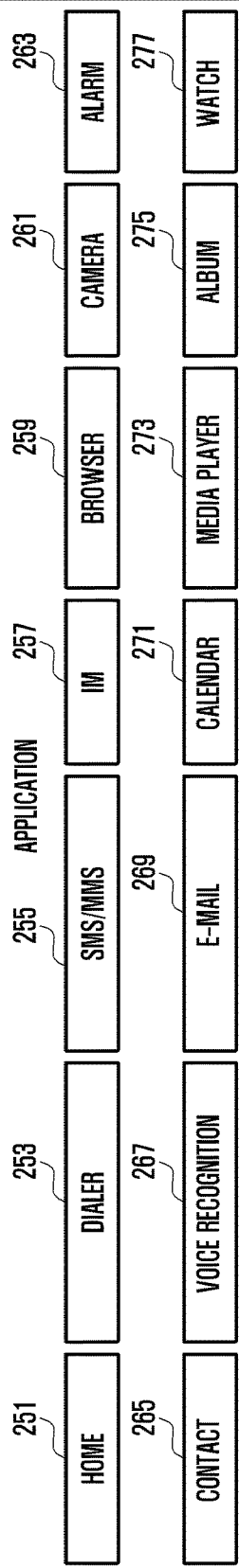
FIG. 2 is a block diagram illustrating a program according to various embodiments.
Figure 2:
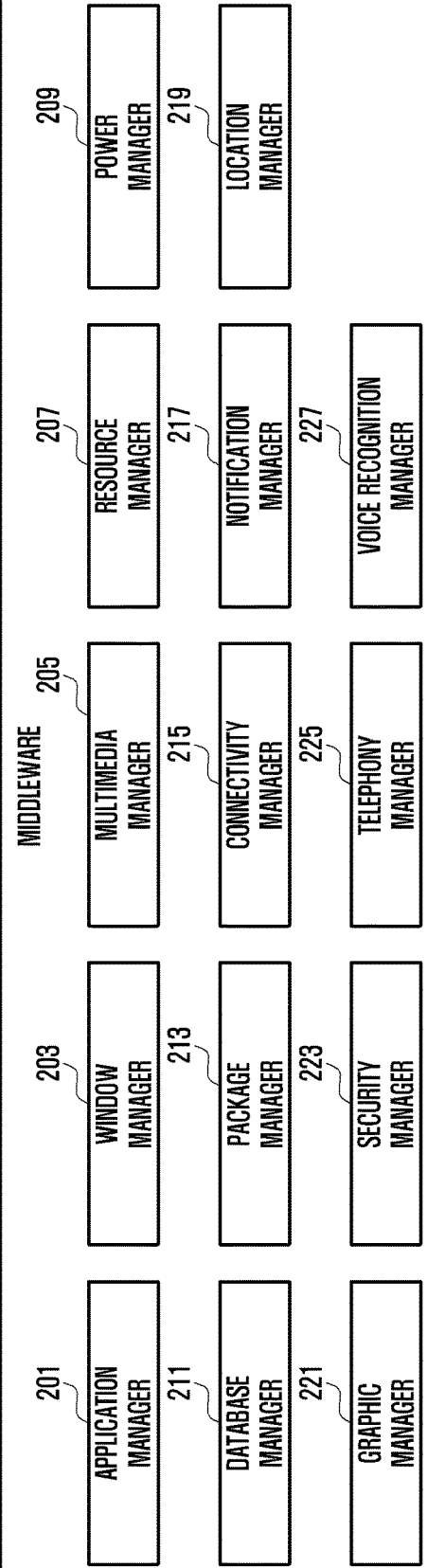

FIG. 2 is a block diagram 200 illustrating a program 140 according to various embodiments. According to an embodiment, the program 140 may include an operating system 142 for controlling one or more resources of the electronic device 101, middleware 144, or an application 146 executable in the operating system 142. The operating system 142 may include, for example, Android™, iOS™, Windows™, Symbian™, Tizen™, or Bada™. At least some of the programs 140 may be, for example, preloaded into the electronic device 101 when producing, downloaded from an external electronic device (e.g., the electronic device 102 or 104, or the server 108), or updated when used by a user.

The operating system 142 may control management (e.g., allocation or recovery) of one or more system resources (e.g., process, memory, or power) of the electronic device 101. The operating system 142 may additionally or alternatively include one or more driver programs for driving other hardware devices, for example, an input module 150, audio output module 155, display module 160, audio module 170, sensor module 176, interface 177, haptic module 179, camera module 180, power management module 188, battery 189, communication module 190, subscriber identity module 196, or antenna module 197 of the electronic device 101.

The middleware 144 may provide various functions to the application 146 so that functions or information provided from one or more resources of the electronic device 101 may be used by the application 146. The middleware 144 may include, for example, an application manager 201, window manager 203, multimedia manager 205, resource manager 207, power manager 209, database manager 211, package manager 213, connectivity manager 215, notification manager 217, location manager 219, graphics manager 221, security manager 223, telephony manager 225, or voice recognition manager 227.

The application manager 201 may for example, manage a life cycle of the application 146. The window manager 203 may for example, manage one or more GUI resources used on the screen. The multimedia manager 205 may for example, identify one or more formats required for reproducing media files, and encode or decode the corresponding media file using a codec appropriate for the selected format. The resource manager 207 may for example, manage a source code of the application 146 or a memory space of the memory 130. The power manager 209 may for example, manage the capacity, temperature, or power of the battery 189, and determine or provide related information necessary for the operation of the electronic device 101 using the information. According to an embodiment, the power manager 209 may associate with a basic input/output system (BIOS) (not illustrated) of the electronic device 101.

The database manager 211 may for example, create, search, or change a database to be used by the application 146. The package manager 213 may for example, manage installation or update of applications distributed in the form of package files. The connectivity manager 215 may for example, manage a wireless connection or direct connection between the electronic device 101 and an external electronic device. The notification manager 217 may for example, provide a function for notifying the user of occurrence of a designated event (e.g., incoming call, message, or alarm). The location manager 219 may for example, manage location information of the electronic device 101. The graphics manager 221 may for example, manage one or more graphic effects to be provided to the user or a user interface related thereto.

The security manager 223 may provide, for example, system security or user authentication. The telephony manager 225 may manage, for example, a voice call function or a video call function provided by the electronic device 101. The voice recognition manager 227 may for example, transmit the user's voice data to the server 108 and receive a command corresponding to a function to be performed in the electronic device 101 based on at least part of the voice data or text data converted based on at least part of the voice data from the server 108. According to an embodiment, the middleware 244 may dynamically delete some existing components or add new components. According to an embodiment, at least a portion of the middleware 144 may be included as part of the operating system 142 or may be implemented into separate software different from the operating system 142.

The application 146 may include, for example, a home 251, dialer 253, SMS/MMS 255, instant message (IM) 257, browser 259, camera 261, alarm 263, contact 265, voice recognition 267, email 269, calendar 271, media player 273, album 275, watch 277, health 279 (e.g., measure biometric information such as exercise amount or blood sugar), or environment information 281 (e.g., measure atmospheric pressure, humidity, or temperature information) application. According to an embodiment, the application 146 may further include an information exchange application (not illustrated) that may support information exchange between the electronic device 101 and an external electronic device. The information exchange application may include, for example, a notification relay application configured to transmit designated information (e.g., call, message, or alarm) to an external electronic device, or a device management application configured to manage the external electronic device. The notification relay application may for example, transmit notification information corresponding to a designated event (e.g., mail reception) generated in another application (e.g., the email application 269) of the electronic device 101 to the external electronic device. Additionally or alternatively, the notification relay application may receive notification information from the external electronic device and provide the notification information to the user of the electronic device 101.

The device management application may for example, control power (e.g., turn-on or turn-off) or a function (e.g., brightness, resolution, or focus) of an external electronic device that communicates with the electronic device 101 or some component thereof (e.g., a display module or camera module of the external electronic device). The device management application may additionally or alternatively support installation, deletion, or update of an application operating in the external electronic device.

Figure 3:
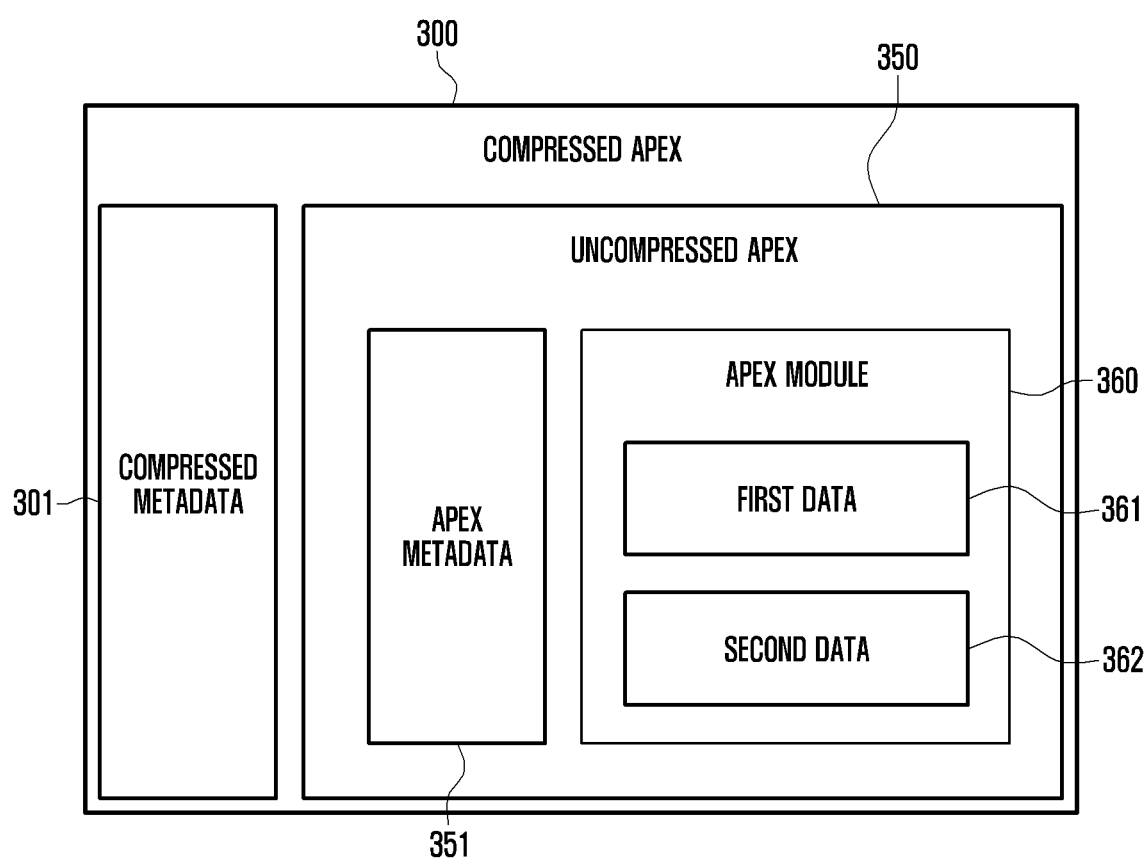
FIG. 3 is a block diagram illustrating a format of a compressed APEX file according to various embodiments.

FIG. 3 is a block diagram illustrating a format of a compressed APEX 300 file according to various embodiments.

With reference to FIG. 3, the compressed APEX 300 may include compressed metadata 301 and uncompressed APEX 350. The uncompressed APEX 350 may include an APEX module 360 including original metadata and a first file 361 and/or a second file 362. Components included in FIG. 3 are some of the components included in the compressed APEX 300, and the compressed APEX 300 may include various other components.

According to various embodiments, the uncompressed APEX 350 may be an original uncompressed APEX file. The uncompressed APEX 350 may be a zip file in which some modules included in a framework are constituted into one package form.

According to an embodiment, the uncompressed APEX 350 may correspond to an original apex file and/or an uncompressed APEX 350 file (e.g., original apex and/or decompressed apex).

According to an embodiment, the uncompressed APEX 350 may include an APEX module 360. The APEX module 360 may be a file system including a first file 361 and/or a second file 362, which are (is) general files. For example, the APEX modules 360 may include data files such as execution files such as "executable", native libraries such as "so", and Java libraries such as "jar".

According to an embodiment, the uncompressed APEX 350 may include APEX metadata 351. The APEX metadata 351 may include data related to APEX such as a package name that identifies an APEX file, a version, and/or a public key used in the file system.

According to an embodiment, the uncompressed APEX 350 may be stored in a designated location (e.g., readable/writeable user data area,/data/apex/decompressed) in the memory 130.

According to an embodiment, an APEX manager 421 (e.g., depicted in FIG. 4) may mount the uncompressed APEX 350 at a designated location to activate the APEX module 360. The APEX module 360 mounted in a designated location (e.g., /data/apex/active) may be used by a user process (e.g., application).

According to various embodiments, the compressed APEX 300 may be a compressed file of the uncompressed APEX 350.

According to an embodiment, the compressed APEX 300 may correspond to a capex file (e.g., compressed apex).

According to an embodiment, the compressed APEX 300 may include compressed metadata 301. The compressed metadata 301 may include data related to APEX such as a package name that identifies an APEX file, a version, and/or a public key used in the file system.

According to an embodiment, the compressed APEX 300 may include uncompressed APEX 350.

According to an embodiment, the APEX manager 421 may decompress the compressed APEX 300 to create uncompressed APEX 350 and store the created uncompressed APEX 350 in a designated location (e.g., readable/writeable user data area,/data/apex/decompressed) of the memory 130.

According to an embodiment, the compressed APEX 300 may be located in a designated location (e.g., read-only area,/system) of the memory 130.

Figure 4:
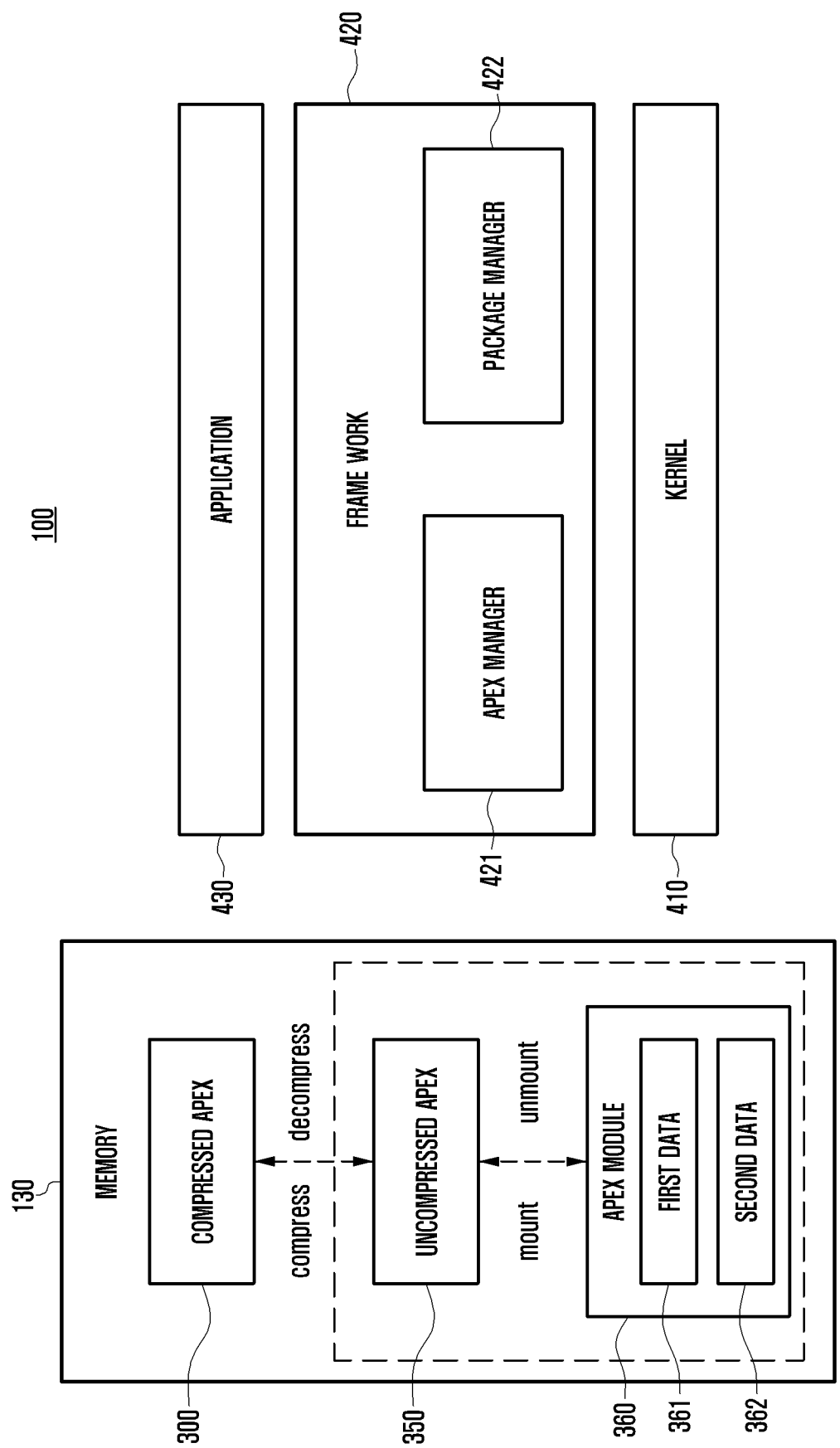
FIG. 4 is a block diagram illustrating a constitution of an operating system of an electronic device according to various embodiments.

FIG. 4 is a block diagram illustrating a constitution of an operating system 142 of the electronic device 101 according to various embodiments.

According to various embodiments, the operating system 142 of the electronic device 101 may be implemented in a processor (e.g., the processor 120 of FIG. 1).

According to various embodiments, the operating system 142 of the electronic device 101 may include an application 430, a framework 420, and/or a kernel 410.

According to various embodiments, the kernel 410 is a lowest layer in the operating system of the electronic devices 101 and 100 and may manage a system of the electronic devices 101 and 100.

According to an embodiment, in order to identify the integrity and consistency of files stored in a user data area, the kernel 410 may perform an integrity check (e.g., device-mapper-verity (dm-verity)). For example, the integrity check may be a method of storing a previously loaded hash value in an internally generated hash tree and comparing the previously loaded hash value with a hash value generated when loading a new file to identify whether the previously loaded hash value matches the generated hash value. For example, corresponding to the hash values not matching in an integrity check due to corruption in the file, the kernel 410 may generate kernel panic (or alert).

For example, corresponding to corruption occurring in the uncompressed APEX 350, the kernel 410 may generate kernel panic (dmv corrupt) in an integrity check for the uncompressed APEX 350 and store a panic message in the designated node (e.g., /proc/extra node) of the memory 130.

According to various embodiments, the framework 420 may implement a standard structure for an operating system of the electronic devices 101 and 100 with an upper layer of the kernel 410 and a lower layer of the application 430 in an operating system of the electronic devices 101 and 100.

According to an embodiment, the framework 420 may include an APEX manager 421 and a package manager 422.

According to various embodiments, the APEX manager 421 may be a stand-alone native process responsible for authenticating, installing, and uninstalling APEX files.

According to an embodiment, the APEX manager 421 may manage the compressed APEX 300 and/or the uncompressed APEX 350.

The APEX manager 421 may decompress the compressed APEX 300 to create uncompressed APEX 350 and store the created uncompressed APEX 350 in a designated location (e.g., readable/writable user data area,/data/apex/decompressed) of the memory 130.

According to an embodiment, the APEX manager 421 may mount the uncompressed APEX 350 at a designated location to activate the APEX module 360. For example, the APEX manager 421 may read the uncompressed APEX 350 to determine validity, and mount the uncompressed APEX 350 determined to be valid at a designated location. The APEX module 360 mounted in a designated location (e.g., /data/apex/active) may be used by a user process (e.g., the application 430).

According to various embodiments, the package manager 422 may be a service module of the framework 420 that performs management operations for applications installed in the electronic device 101.

According to an embodiment, the package manager 422 may scan application files (e.g., apk files) stored in the electronic device 101 during a framework initialization process and perform a check on the signature of the application file. For example, the package manager 422 may perform a signature check on the application file included in the APEX module 360.

The signature check may be a check in which the package manager 422 determines whether a signature designated for the application file matches a verified signature. The package manager 422 may identify that the application file is or has integrity in the case that a verified signature for the application file matches a designated signature, and the package manager 422 may identify that damage has occurred in the application file in the case that a verified signature for the application file mismatches a designated signature.

According to an embodiment, corresponding to determining that damage has occurred in the application file in the signature check, the package manager 422 may determine it to an exception and restart a platform.

According to various embodiments, the memory 130 may store the compressed APEX 300, the uncompressed APEX 350, and/or the APEX module 360.

According to an embodiment, the APEX manager 421 may decompress the compressed APEX 300 to create uncompressed APEX 350. The uncompressed APEX 350 may be stored in a designated location (e.g., readable/writeable user data area,/data/apex/decompressed) in the memory 130.

According to an embodiment, the APEX manager 421 may compress the uncompressed APEX 350 to create compressed APEX 300.

According to an embodiment, the APEX manager 421 may mount the uncompressed APEX 350 to create APEX module 360. The APEX manager 421 may mount the uncompressed APEX 350 at a designated location to activate the APEX module 360.

The APEX module 360 mounted in a designated location (e.g.,/data/apex/active) may be used by a user process (e.g., application).

According to an embodiment, the APEX manager 421 may unmount the APEX module 360 to create uncompressed APEX 350.

Figure 5A:
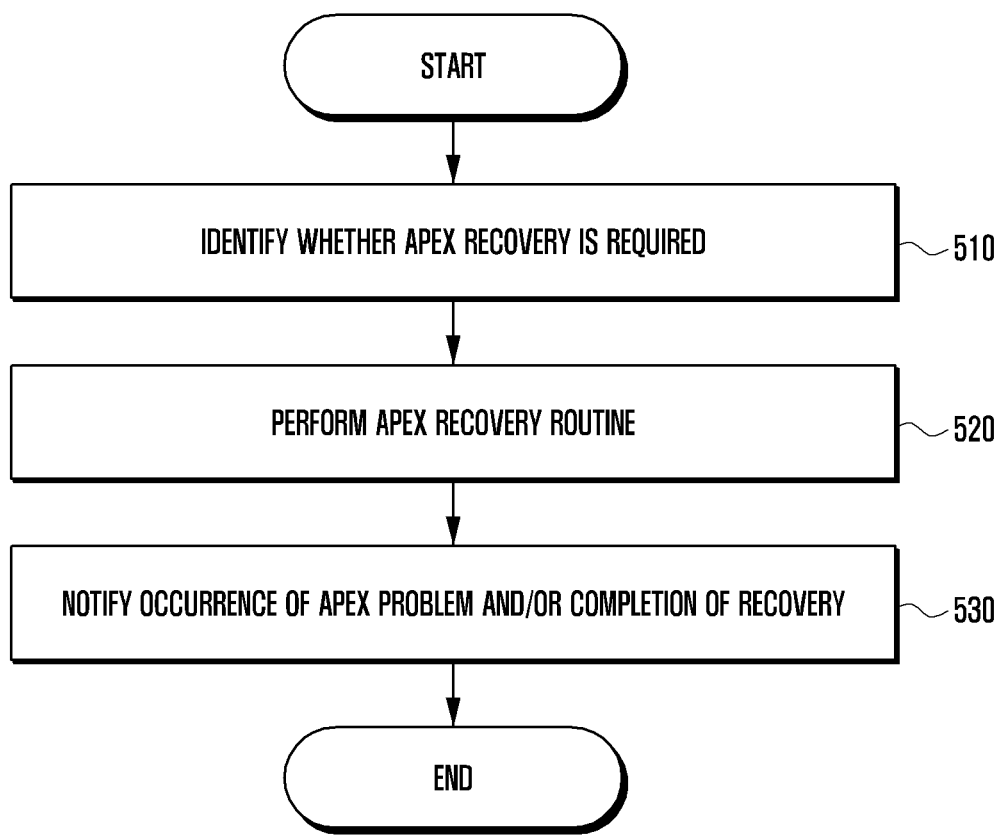
FIG. 5A is a flowchart illustrating a method in which an APEX manager performs a recovery routine of an APEX file according to various embodiments.

FIG. 5A is a flowchart illustrating a method in which the APEX manager 421 performs a recovery routine of an APEX file according to various embodiments.

According to various embodiments, in operation 510, the APEX manager 421 may identify whether APEX recovery is required.

According to an embodiment, the APEX manager 421 may identify whether APEX recovery is required corresponding to identifying a panic (or alert) message in a designated node. For example, corresponding to corruption occurring in the uncompressed APEX 350, the kernel 410 may generate kernel panic (dmv corrupt) by an integrity check, and store in a panic message in a designated node (e.g.,/proc/extra node) of the memory 130. The APEX manager 421 may identify the panic message stored in the designated node to identify whether there is kernel panic.

According to an embodiment, the APEX manager 421 may identify whether APEX recovery is required corresponding to identifying a property configured by the package manager. For example, the package manager 422 may configure a property for notifying the APEX manager 421 of the APEX module 360 to restore. For example, a property configuration may be a method in which the APEX manager 421 stores a designated value in a designated area of the memory (e.g., the memory 130 of FIG. 1).

According to various embodiments, in operation 520, the APEX manager 421 may perform an APEX recovery routine.

A specific operation in which the APEX manager 421 performs an APEX recovery routine will be described later in the description related to FIG. 5B.

According to various embodiments, in operation 530, the APEX manager 421 may notify an occurrence of an APEX problem and/or completion of recovery.

According to an embodiment, the APEX manager 421 may notify the occurrence of an APEX problem and/or completion of recovery corresponding to identifying a property indicating that a recovery routine for the APEX is performed.

According to an embodiment, the APEX manager 421 may display information that may notify an occurrence of an APEX problem and/or completion of recovery on the display (e.g., the display module 160 of FIG. 1). For example, the APEX manager 421 may display information that may notify an occurrence of an APEX problem and/or completion of recovery with a notification and/or pop-up window method.

According to an embodiment, the APEX manager 421 may display information indicating that the designated uncompressed APEX 350 has been restored corresponding to the fact that the recovered uncompressed APEX 350 is a designated type of uncompressed APEX 350.

Figure 5B:
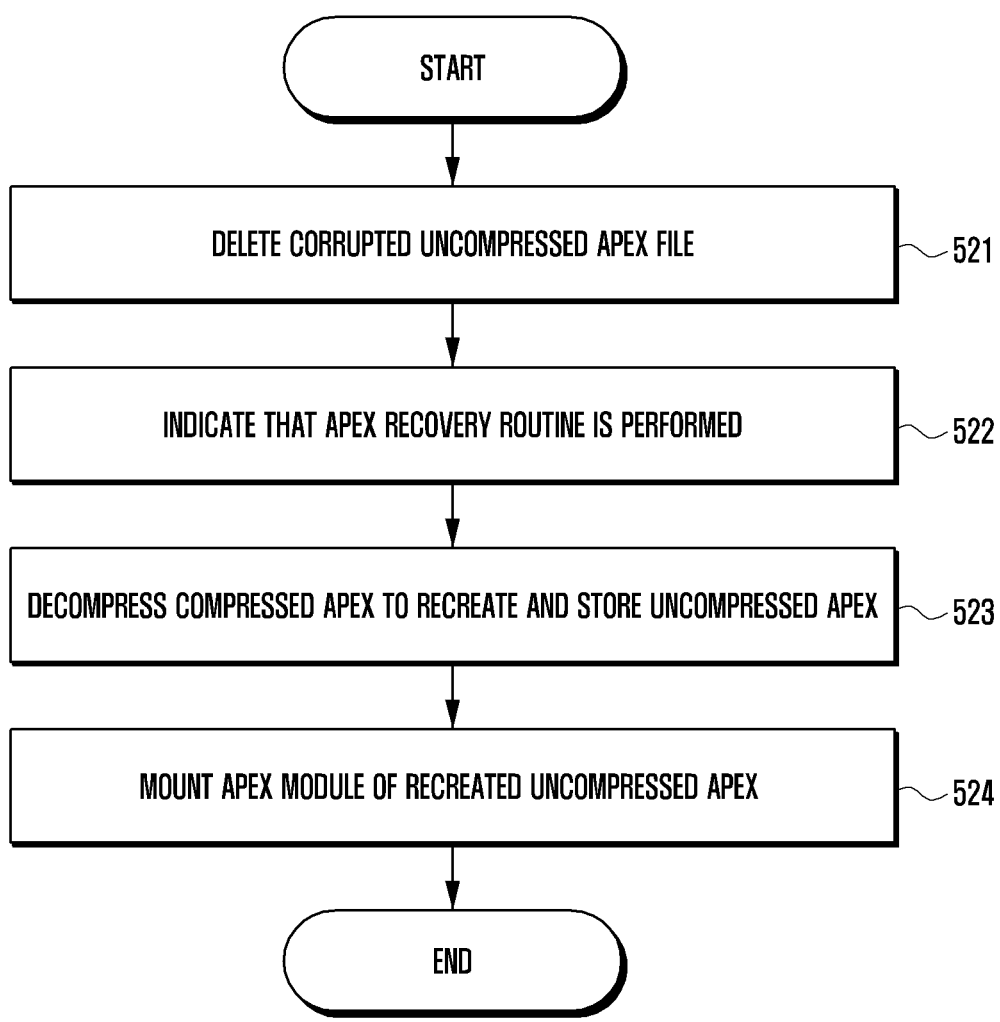
FIG. 5B is a flowchart illustrating a method in which an APEX manager restores an APEX file according to various embodiments.

FIG. 5B is a flowchart illustrating a method in which the APEX manager 421 restores an APEX file according to various embodiments.

The flowchart illustrated in FIG. 5B may be a specific embodiment of operation 520 of FIG. 5A.

According to various embodiments, in operation 521, the APEX manager 421 may delete a corrupted uncompressed APEX 350 file.

According to an embodiment, the APEX manager 421 may delete the corrupted uncompressed APEX 350 file corresponding to identifying whether APEX recovery is required in operation 510.

According to an embodiment, the APEX manager 421 may delete the corrupted APEX file corresponding to the panic message corresponding to identifying the panic message in the designated node. For example, corresponding to corruption occurring in the uncompressed APEX 350, the kernel 410 may generate kernel panic (dmv corrupt) by an integrity check, and store a panic message in a designated node (e.g.,/proc/extra node) of the memory 130. The APEX manager 421 may identify the panic message stored in the designated node to identify whether there is kernel panic.

According to an embodiment, the APEX manager 421 may delete the corrupted APEX file corresponding to a property corresponding to identifying the property configured by the package manager. For example, the package manager 422 may configure a property for notifying the APEX manager 421 of the APEX module 360 to restore. For example, a property configuration may be a method in which the APEX manager 421 stores a designated value in a designated area of the memory (e.g., the memory 130 of FIG. 1).

According to various embodiments, in operation 522, the APEX manager 421 may indicate that a recovery routine is performed.

According to an embodiment, the APEX manager 421 may configure a property for indicating that a recovery routine for the APEX is performed. For example, a property configuration may be a method in which the APEX manager 421 stores a designated value in a designated area of the memory (e.g., the memory 130 of FIG. 1).

According to various embodiments, in operation 523, the APEX manager 421 may decompress the compressed APEX 300 to recreate and store the uncompressed APEX 350.

According to an embodiment, the APEX manager 421 may decompress the compressed APEX 300 file corresponding to the fact that the uncompressed APEX 350 file does not exist in the memory 130. For example, the APEX manager 421 may decompress the compressed APEX 300 to create uncompressed APEX 350, and store the created uncompressed APEX 350 in a designated location (e.g., readable/writable user data area,/data/apex/decompressed) of the memory 130.

According to various embodiments, in operation 524, the APEX manager 421 may mount the recreated uncompressed APEX 350 module.

According to an embodiment, the APEX manager 421 may mount the APEX module 360 included in the recreated uncompressed APEX 350 in a designated path. For example, the APEX manager 421 may mount the uncompressed APEX 350 at a designated location to activate the APEX module 360. The APEX module 360 mounted in a designated location (e.g., /data/apex/active) may be used by a user process (e.g., application).

Figure 6A:
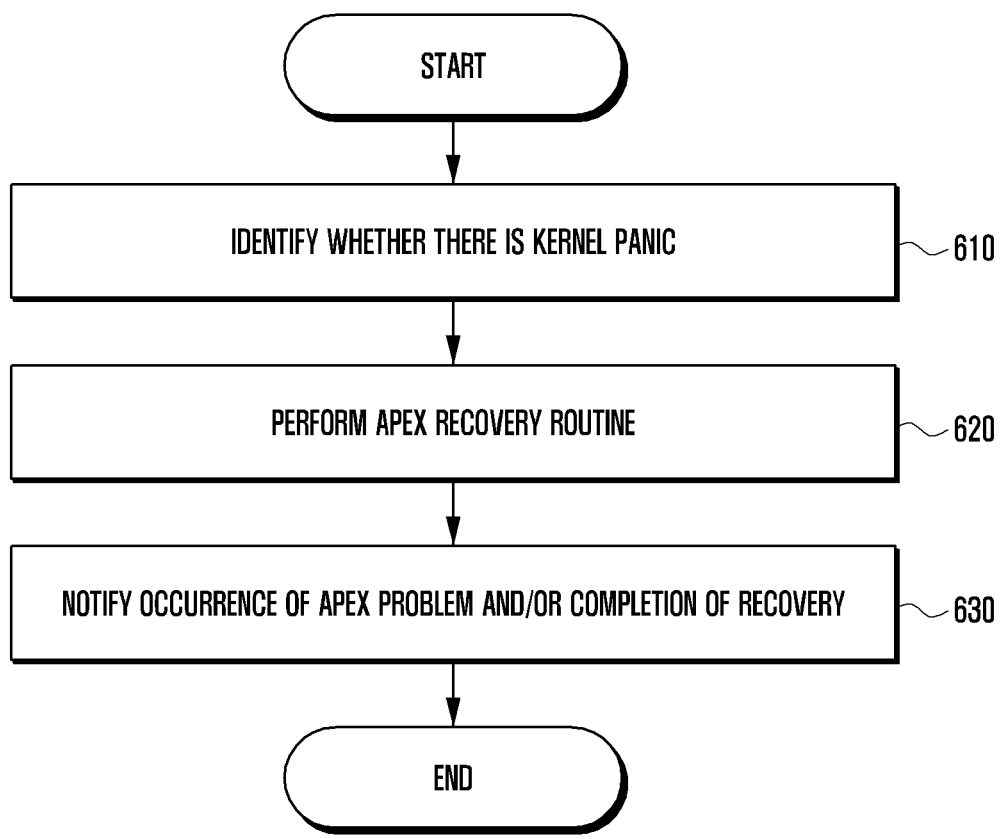
FIG. 6A is a flowchart illustrating a method in which an APEX manager performs a recovery routine of an APEX file according to various embodiments.

FIG. 6A is a flowchart illustrating a method in which the APEX manager 421 performs a recovery routine of an APEX file according to various embodiments.

According to various embodiments, in operation 610, the APEX manager 421 may identify whether there is kernel panic.

According to an embodiment, the APEX manager 421 may identify a panic message stored by the kernel 410 in a designated node to identify whether there is kernel panic.

The kernel panic may be an operation performing corresponding to corruption being in the file when the kernel 410 performs self-check booting through an integrity check in order to identify the integrity and consistency of a file stored in a user data area. For example, the integrity check may be a method of storing a previously loaded hash value in an internally generated hash tree and comparing the previously loaded hash value with a hash value generated when loading a new file to identify whether the previously loaded hash value matches the generated hash value.

For example, the kernel 410 may generate kernel panic (dmv corrupt) by an integrity check and store a panic message in a designated node (e.g., /proc/extra node) of the memory 130 corresponding to corruption occurring in the uncompressed APEX 350. The APEX manager 421 may identify the panic message stored in the designated node to identify whether there is kernel panic.

According to various embodiments, in operation 620, the APEX manager 421 may perform a recovery routine.

According to an embodiment, the APEX manager 421 may perform a recovery routine according to operations 521 to 524 of FIG. 5B corresponding to identifying whether there is kernel panic in operation 610.

According to various embodiments, in operation 630, the APEX manager 421 may notify an occurrence of an APEX problem and/or completion of the recovery routine.

According to an embodiment, the APEX manager 421 may notify the occurrence of an APEX problem and/or completion of recovery corresponding to identifying a property indicating that a recovery routine for the APEX is performed.

According to an embodiment, the APEX manager 421 may display information that may notify an occurrence of an APEX problem and/or completion of recovery on the display (e.g., the display module 160 of FIG. 1). For example, the APEX manager 421 may display information that may notify the occurrence of an APEX problem and/or completion of recovery with a notification and/or pop-up window method.

Figure 6B:
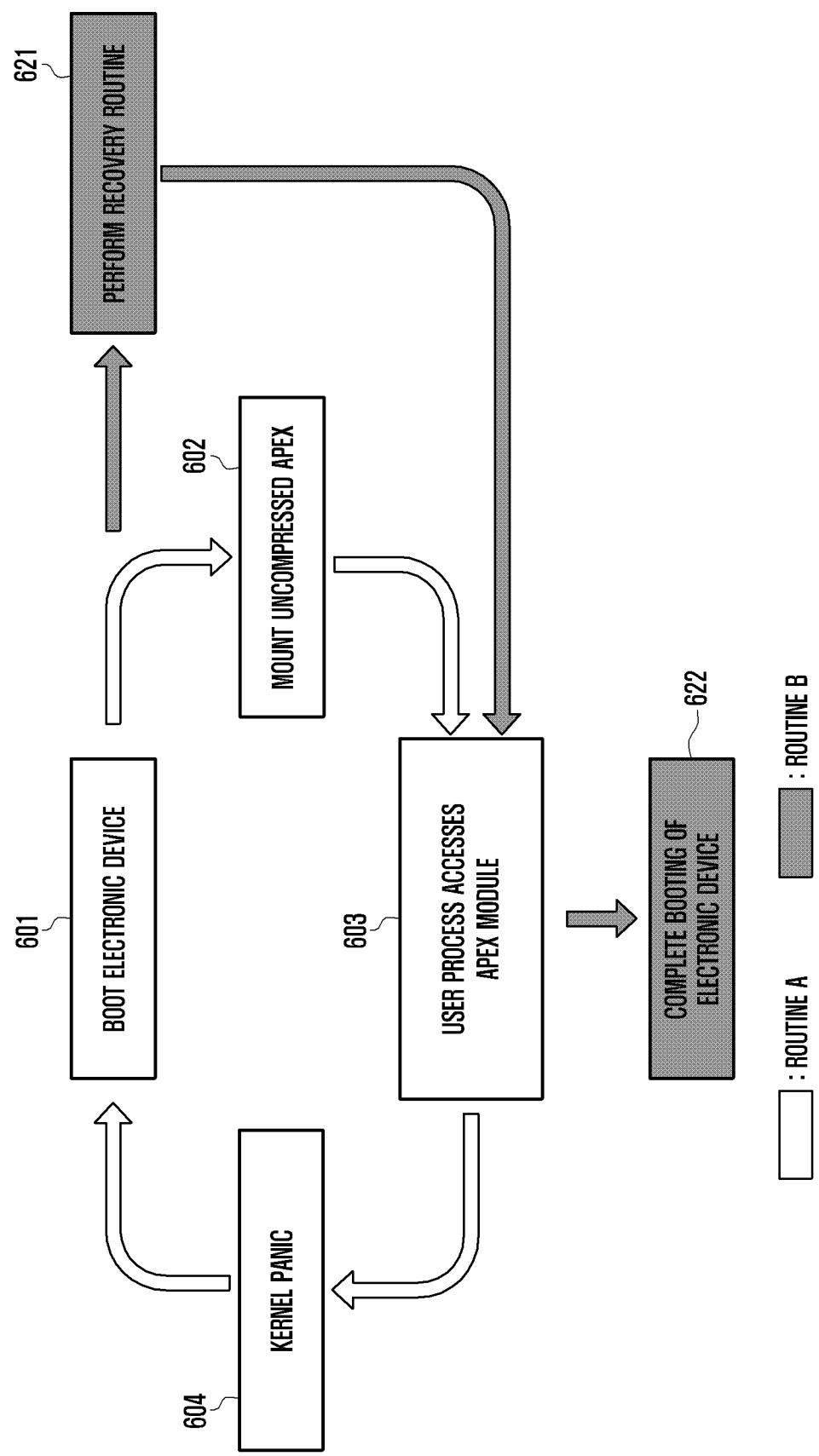
FIG. 6B is a message flow diagram illustrating an operation of an electronic device with respect to a corrupted APEX file according to various embodiments.

FIG. 6B is a message flow diagram illustrating an operation of the electronic device 101 with respect to a corrupted APEX file according to various embodiments.

In the message flow diagram illustrated in FIG. 6B, a routine A may be a routine of the case of not performing a recovery routine of the APEX file illustrated in FIG. 6A, and a routine B may be an added routine of the case of performing a recovery routine of the APEX file illustrated in FIG. 6A.

According to various embodiments, in operation 601, the electronic device 101 may be booted.

According to an embodiment, while the electronic device 101 is being booted, the APEX manager 421 may decompress the compressed APEX 300 to create uncompressed APEX 350, and store the created uncompressed APEX 350 in a designated location (e.g., readable/writeable user data area,/data/apex/decompressed) of the memory 130.

According to an embodiment, the uncompressed APEX 350 may be in a corrupted state due to a problem occurring in a process of decompressing the compressed APEX 300.

According to various embodiments, in operation 602, the electronic device 101 may mount the uncompressed APEX 350.

According to an embodiment, the APEX manager 421 may mount the uncompressed APEX 350 at a designated location to activate the APEX module 360.

According to various embodiments, in operation 603, the electronic device 101 may enable a user process (e.g., application) to access the APEX module 360.

According to an embodiment, the user process may access the APEX module 360 mounted at a designated location (e.g., /data/apex/active) and perform a read operation of the APEX module 360.

According to various embodiments, in operation 604, the electronic device 101 may enter a kernel panic (or alert) state.

According to an embodiment, in order to identify the integrity and consistency of the uncompressed APEX 350 and/or the APEX module 360, the kernel 410 may perform an integrity check (e.g., device-mapper-verity (dm-verity)). For example, the integrity check may be a method of storing a previously loaded hash value in an internally generated hash tree and comparing the previously loaded hash value with a hash value generated when loading a new file to identify whether the previously loaded hash value matches the generated hash value. For example, the kernel 410 may generate kernel panic corresponding to the hash values not matching in an integrity check due to corruption in the file.

For example, the kernel 410 may generate kernel panic (dmv corrupt) in an integrity check on the uncompressed APEX 350 and/or the APEX module 360 corresponding to corruption occurring in the uncompressed APEX 350 and/or the APEX module 360. The kernel 410 may store a panic message in a designated node (e.g., /proc/extra node) of the memory 130.

According to various embodiments, the electronic device 101 may perform again operation 601 after performing operation 604.

According to various embodiments, in the case that the electronic device 101 does not perform the routine B, the electronic device 101 may perform operation 602 after performing operation 601.

According to various embodiments, in the case that the electronic device 101 performs the routine B, the electronic device 101 may perform operation 621 after performing operation 601.

According to various embodiments, in operation 621, the electronic device 101 may perform a recovery routine.

For example, the APEX manager 421 may identify a panic message stored in the designated node to identify whether there is kernel panic.

According to an embodiment, in operation 610, the APEX manager 421 may perform a recovery routine according to operations 521 to 524 of FIG. 5B corresponding to identifying whether there is kernel panic.

According to various embodiments, in operation 603, the electronic device 101 may enable a user process (e.g., application) to access the APEX module 360.

According to an embodiment, the electronic device 101 may use the APEX module 360 mounted at a designated location (e.g.,/data/apex/active) by a user process corresponding to APEX recovery being completed.

According to various embodiments, in operation 622, the electronic device 101 may complete booting thereof.

According to an embodiment, the APEX manager 421 may complete booting of the electronic device 101 corresponding to completing the recovery routine for the APEX.

According to an embodiment, the APEX manager 421 may notify an occurrence of an APEX problem and/or completion of recovery corresponding to identifying a property indicating that a recovery routine for the APEX is performed.

According to an embodiment, the APEX manager 421 may display information that may notify the occurrence of an APEX problem and/or completion of recovery on the display (e.g., the display module 160 of FIG. 1). For example, the APEX manager 421 may display information that may notify the occurrence of an APEX problem and/or completion of recovery with a notification and/or pop-up window method.

Figure 7A:
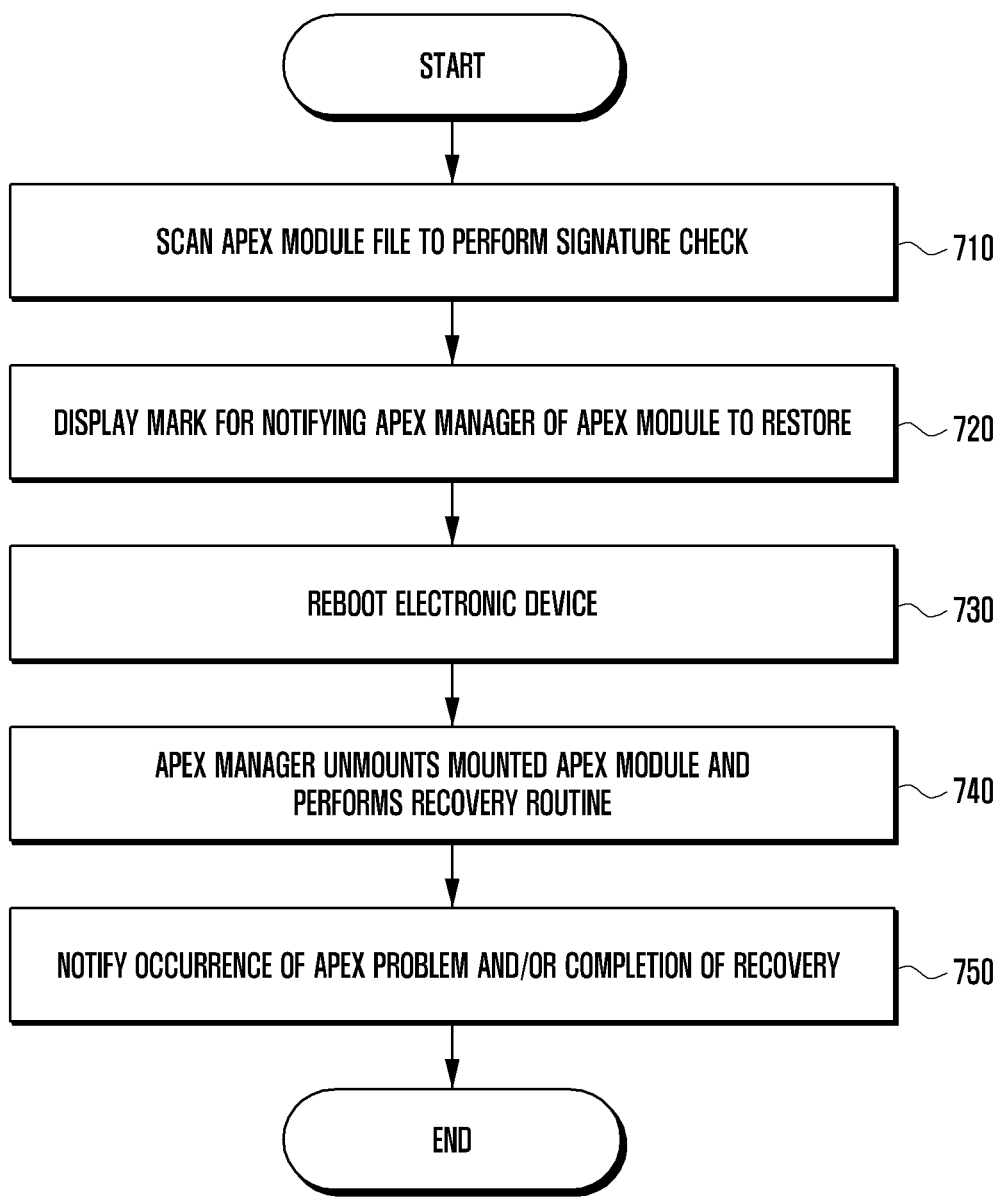
FIG. 7A is a flowchart illustrating a method in which a package manager and an APEX manager perform a recovery routine of an APEX file according to various embodiments.

FIG. 7A is a flowchart illustrating a method in which the package manager 422 and the APEX manager 421 perform a recovery routine of an APEX file according to various embodiments.

According to various embodiments, in operation 710, the package manager 422 may scan the APEX module 360 to perform a signature check.

According to an embodiment, the APEX manager 421 may mount a file in the APEX module 360 included in the uncompressed APEX 350 at a designated location.

According to an embodiment, the package manager 422 may scan the APEX module 360 mounted by the APEX manager 421 and perform a signature check on application files (e.g., the first file 361 and/or the second file 362) included in the APEX module 360. The signature check may be a check in which the package manager 422 determines whether a signature designated for the application file matches a verified signature. The package manager 422 may identify that the application file is or has integrity in the case that a verified signature for the application file matches a designated signature and that damage has occurred in the application file in the case that a verified signature for the application file mismatches a designated signature.

According to an embodiment, the package manager 422 may perform a signature check on application files (e.g., the first file 361 and/or the second file 362) included in the APEX module 360 a designated number of times or more and identify that damage has occurred in the application file corresponding to the signatures not matching a designated number of times or more.

According to various embodiments, in operation 720, the package manager 422 may display a mark for notifying the APEX manager 421 of the APEX module 360 to restore.

According to an embodiment, the package manager 422 may display a mark for notifying the APEX manager 421 of the APEX module 360 to restore corresponding to determining that damage has occurred in the APEX module 360 in the signature check.

According to an embodiment, the package manager 422 may configure a property for notifying the APEX manager 421 of the APEX module 360 to restore. For example, a property configuration may be a method in which the APEX manager 421 stores a designated value in a designated area of the memory (e.g., the memory 130 of FIG. 1).

According to an embodiment, the package manager 422 may transmit information related to the APEX module 360 to restore by various methods (e.g., binder inter process communication (binder IPC)) of transmitting and/or identifying data between modules and/or functions to the APEX manager 421.

According to various embodiments, in operation 730, the package manager 422 may reboot the electronic device 101.

According to an embodiment, the package manager 422 may perform a rebooting operation of the electronic device 101.

According to an embodiment, the package manager 422 may perform operation 740 without rebooting the electronic device 101 according to operation 730.

According to various embodiments, in operation 740, the APEX manager 421 may unmount the mounted APEX module 360 and perform an APEX recovery routine.

According to an embodiment, the APEX manager 421 may unmount the mounted APEX module 360.

According to an embodiment, the APEX manager 421 may delete the unmounted uncompressed APEX 350 corresponding to the APEX module 360 to restore. For example, the APEX manager 421 may identify a property configured by the package manager 422 and delete the unmounted uncompressed APEX 350 corresponding to the APEX module 360 to restore. For example, the APEX manager 421 may delete the unmounted uncompressed APEX 350 corresponding to the APEX module 360 to restore based on information received from the package manager 422 by various methods (e.g., binder IPC) of transmitting and/or identifying data between modules and/or functions.

According to an embodiment, the APEX manager 421 may perform a recovery routine according to operations 521 to 524 of FIG. 5B.

According to an embodiment, the APEX manager 421 may transmit information related to completion of the recovery routine to the package manager 422 by various methods (e.g., binder IPC) of transmitting and/or identifying data between modules and/or functions.

According to various embodiments, in operation 750, the APEX manager 421 may notify an occurrence of an APEX problem and/or completion of the recovery routine.

According to an embodiment, the APEX manager 421 may notify the occurrence of an APEX problem and/or completion of recovery corresponding to identifying a property indicating that a recovery routine for the APEX is performed.

According to an embodiment, the APEX manager 421 may display information that may notify an occurrence of an APEX problem and/or completion of recovery on the display (e.g., the display module 160 of FIG. 1). For example, the APEX manager 421 may display information that may notify the occurrence of an APEX problem and/or completion of recovery with a notification and/or pop-up window method.

Figure 7B:
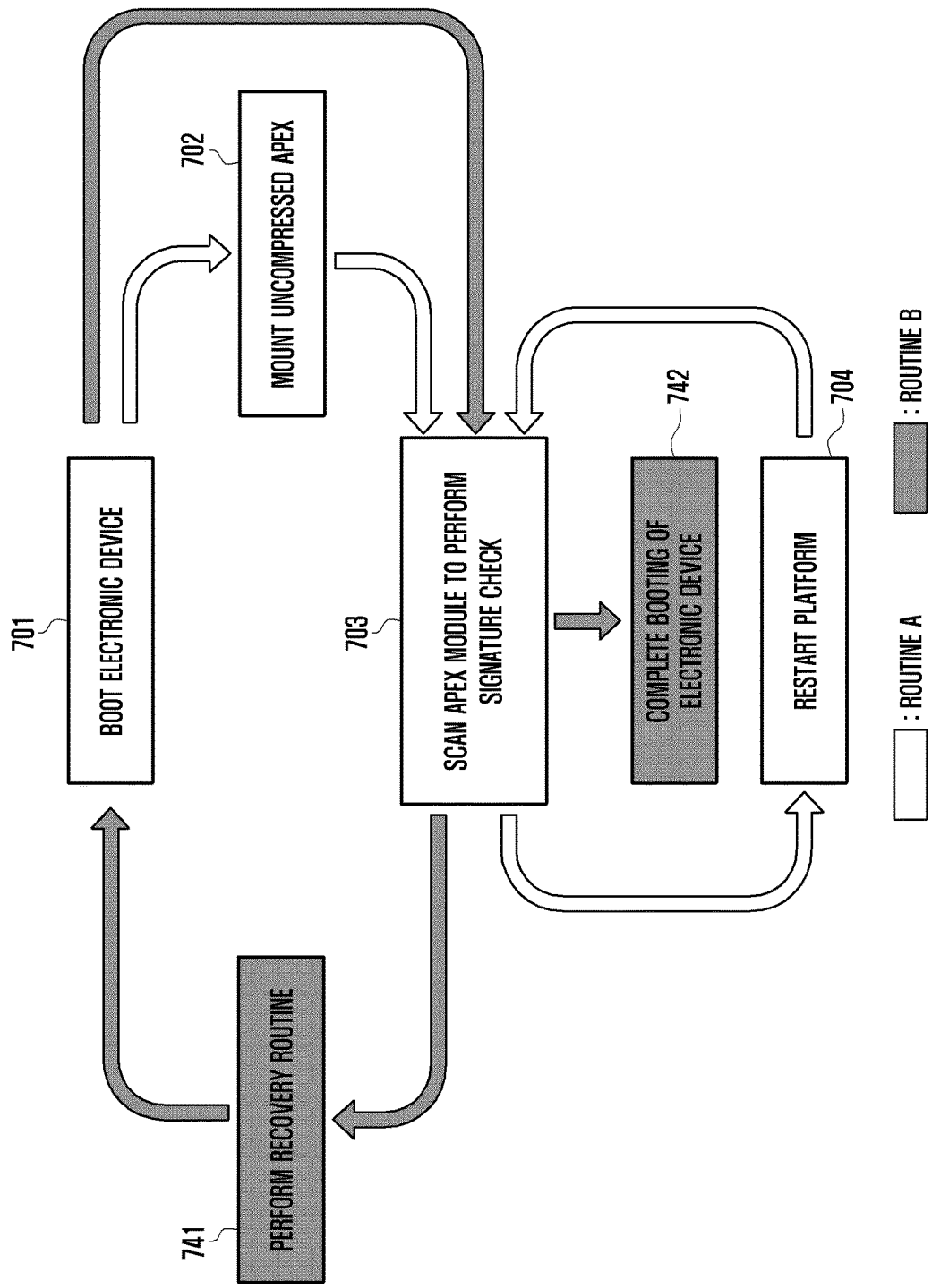
FIG. 7B is a message flow diagram illustrating an operation of an electronic device with respect to a corrupted APEX file according to various embodiments.

FIG. 7B is a message flow diagram illustrating an operation of the electronic device 101 with respect to a corrupted APEX file according to various embodiments.

In the message flow diagram illustrated in FIG. 7B, a routine A is a routine of the case of not performing a recovery routine of the APEX file illustrated in FIG. 7A, and a routine B may be an added routine of the case of performing a recovery routine of the APEX file illustrated in FIG. 7A.

According to various embodiments, in operation 701, the electronic device 101 may be booted.

According to an embodiment, while the electronic device 101 is being booted, the APEX manager 421 may decompress the compressed APEX 300 to create uncompressed APEX 350, and store the created uncompressed APEX 350 in a designated location (e.g., readable/writeable user data area,/data/apex/decompressed) of the memory 130.

According to an embodiment, the uncompressed APEX 350 may be in a corrupted state due to a problem occurring in a process of decompressing the compressed APEX 300.

According to various embodiments, in operation 702, the electronic device 101 may mount the uncompressed APEX 350.

According to an embodiment, the APEX manager 421 may mount the uncompressed APEX 350 at a designated location to activate the APEX module 360.

According to various embodiments, in operation 703, the electronic device 101 may scan the APEX module 360 to perform a signature check.

According to an embodiment, the package manager 422 may scan the APEX module 360 mounted by the APEX manager 421 and perform a signature check of application files (e.g., the first file 361 and/or the second file 362) included in the APEX module 360. The signature check may be a check in which the package manager 422 determines whether a signature designated for the application file matches a verified signature.

According to an embodiment, the package manager 422 may identify that damage has occurred in the application file corresponding to a signature verified for the application file not matching a designated signature.

According to various embodiments, in the case that the electronic device 101 does not perform the routine B, the electronic device 101 may perform operation 704 after performing operation 703.

According to various embodiments, in the case that the electronic device 101 performs the routine B, the electronic device 101 may perform operation 741 after performing operation 703.

According to various embodiments, in operation 704, the electronic device 101 may restart the platform.

According to an embodiment, corresponding to determining that damage has occurred in the application file in a signature check for the application file included in the APEX module 360, the package manager 422 may determine it to be an exception and restart the platform.

According to various embodiments, in operation 741, the electronic device 101 may perform a recovery routine.

For example, the APEX manager 421 may identify a panic message stored in the designated node to identify whether there is kernel panic.

According to an embodiment, in operation 610, the APEX manager 421 may perform a recovery routine according to operations 521 to 524 of FIG. 5B corresponding to identifying whether there is kernel panic.

According to various embodiments, in operation 701, the electronic device 101 may be rebooted. For example, the electronic device 101 may perform a recovery routine and rebooting thereof.

According to various embodiments, in operation 703, the electronic device 101 may scan the APEX module 360 to perform a signature check.

According to an embodiment, the package manager 422 may scan the APEX module 360 mounted by the APEX manager 421 to perform a signature check of application files (e.g., the first file 361 and/or the second file 362) included in the APEX module 360. The signature check may be a check in which the package manager 422 determines whether a signature designated for the application file matches a verified signature.

According to an embodiment, the package manager 422 may identify the integrity of the application file corresponding to a signature verified for the application file matching a designated signature.

According to various embodiments, in operation 742, the electronic device 101 may complete booting thereof.

According to an embodiment, the APEX manager 421 may complete booting of the electronic device 101 corresponding to completing the recovery routine for the APEX.

According to an embodiment, the APEX manager 421 may notify an occurrence of an APEX problem and/or completion of recovery corresponding to identifying a property indicating that a recovery routine for the APEX is performed.

According to an embodiment, the APEX manager 421 may display information that may notify the occurrence of an APEX problem and/or completion of recovery on the display (e.g., the display module 160 of FIG. 1). For example, the APEX manager 421 may display information that may notify the occurrence of an APEX problem and/or completion of recovery with a notification and/or pop-up window method.

Figure 7C:
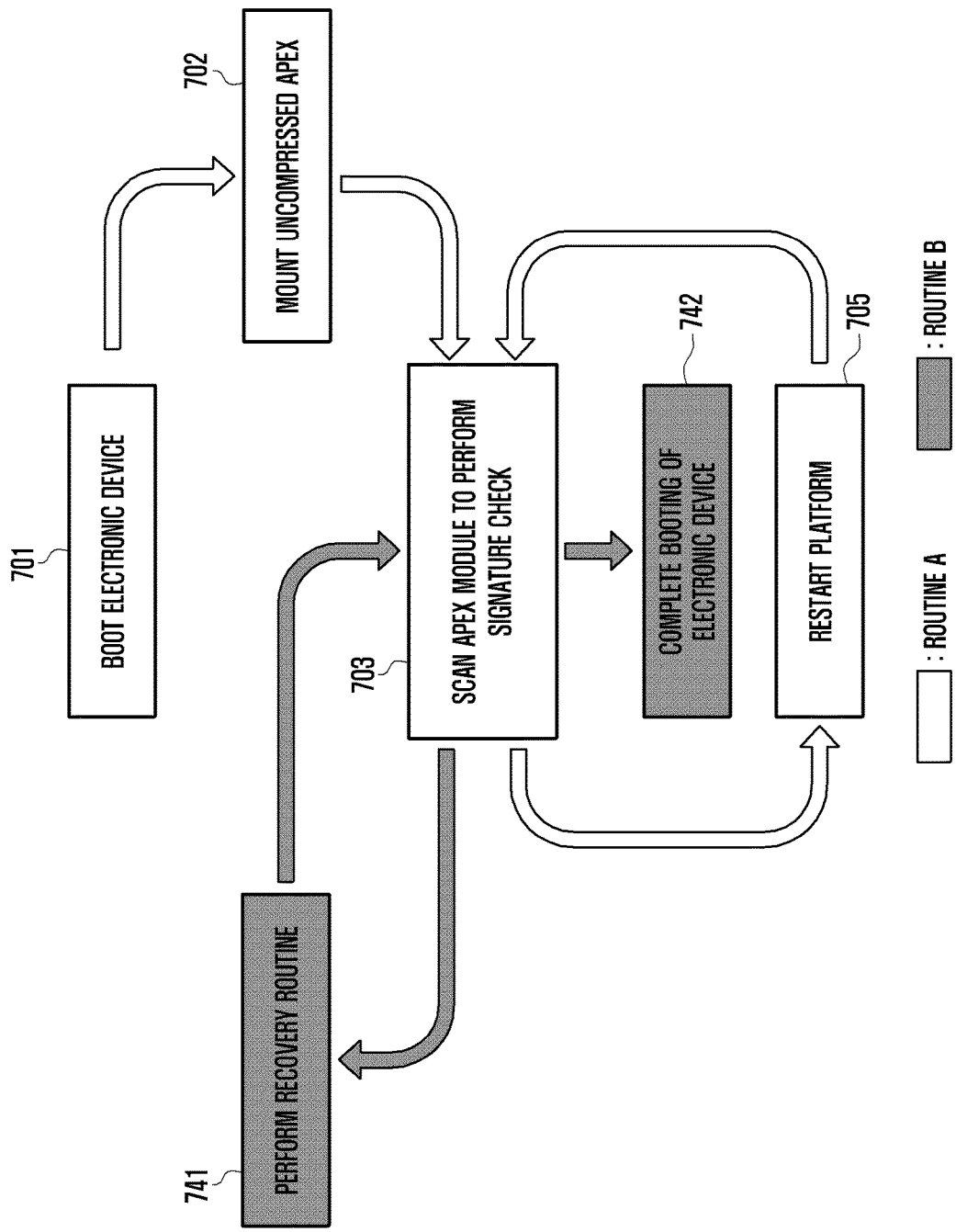
FIG. 7C is a message flow diagram illustrating an operation of an electronic device with respect to a corrupted APEX file according to various embodiments.

FIG. 7C is a message flow diagram illustrating an operation of the electronic device 101 with respect to a corrupted APEX file according to various embodiments.

In the message flow diagram illustrated in FIG. 7C, a routine A may be a routine of the case of not performing a recovery routine of the APEX file illustrated in FIG. 7A, and a routine B may be an added routine of the case of performing a recovery routine of the APEX file illustrated in FIG. 7A.

According to various embodiments, in operation 701, the electronic device 101 may be booted.

According to an embodiment, while the electronic device 101 is being booted, the APEX manager 421 may decompress the compressed APEX 300 to create uncompressed APEX 350, and store the created uncompressed APEX 350 in a designated location (e.g., readable/writeable user data area,/data/apex/decompressed) of the memory 130.

According to an embodiment, the uncompressed APEX 350 may be in a corrupted state due to a problem occurring in a process of decompressing the compressed APEX 300.

According to various embodiments, in operation 702, the electronic device 101 may mount the uncompressed APEX 350.

According to an embodiment, the APEX manager 421 may mount the uncompressed APEX 350 at a designated location to activate the APEX module 360.

According to various embodiments, in operation 703, the electronic device 101 may scan the APEX module 360 to perform a signature check.

According to an embodiment, the package manager 422 may scan the APEX module 360 mounted by the APEX manager 421 and perform a signature check on application files (e.g., the first file 361 and/or the second file 362) included in the APEX module 360. The signature check may be a check in which the package manager 422 determines whether a signature designated for the application file matches a verified signature.

According to an embodiment, the package manager 422 may identify that damage has occurred in the application file corresponding to the signature verified for the application file not matching the designated signature.

According to various embodiments, in the case that the electronic device 101 does not perform a routine B, the electronic device 101 may perform operation 705 after performing operation 703.

According to various embodiments, in the case that the electronic device 101 performs the routine B, the electronic device 101 may perform operation 741 after performing operation 703.

According to various embodiments, in operation 705, the electronic device 101 may restart the platform.

According to an embodiment, corresponding to determining that damage has occurred in the application file in a signature check on the application file included in the APEX module 360, the package manager 422 may determine it to be an exception and restart the platform.

According to various embodiments, in operation 741, the electronic device 101 may perform a recovery routine.

For example, the APEX manager 421 may identify a panic message stored in the designated node to identify whether there is kernel panic.

According to an embodiment, the APEX manager 421 may perform a recovery routine according to operations 521 to 524 of FIG. 5B corresponding to identifying whether there is kernel panic in operation 610.

According to an embodiment, the electronic device 101 may perform a recovery routine without rebooting thereof.

According to various embodiments, in operation 703, the electronic device 101 may scan the APEX module 360 to perform a signature check.

According to an embodiment, the package manager 422 may scan the APEX module 360 mounted by the APEX manager 421 and perform a signature check on application files (e.g., the first file 361 and/or the second file 362) included in the APEX module 360. The signature check may be a check in which the package manager 422 determines whether a signature designated for the application file matches a verified signature.

According to an embodiment, the package manager 422 may identify the integrity of the application file corresponding to the signature verified for the application file matching the designated signature.

According to various embodiments, in operation 742, the electronic device 101 may complete booting thereof.

According to an embodiment, the APEX manager 421 may complete booting of the electronic device 101 corresponding to completing the recovery routine for the APEX.

According to an embodiment, the APEX manager 421 may notify an occurrence of an APEX problem and/or completion of recovery corresponding to identifying a property indicating that a recovery routine for the APEX is performed.

According to an embodiment, the APEX manager 421 may display information that may notify occurrence of an APEX problem and/or completion of recovery on the display (e.g., the display module 160 of FIG. 1). For example, the APEX manager 421 may display information that may notify the occurrence of an APEX problem and/or completion of recovery with a notification and/or pop-up window method.

The electronic device 101 according to various embodiments may include a memory 130 that stores a compressed file 350 of a file 300 that constitutes at least one module 360 into a package; and a processor 120, wherein the processor 120 may decompress the compressed file 300 to create an uncompressed file 350, store the created uncompressed file 350 in the memory 130, identify whether corruption has occurred in the uncompressed file 350 while booting the electronic device 101, and perform a recovery operation of the uncompressed file 350 corresponding to corruption occurring in the uncompressed file 350.

In the electronic device 101 according to various embodiments, the processor 120 may delete the uncompressed file 350 in which corruption has occurred, decompress the compressed file 300 stored in the memory 130 to recreate the uncompressed file 350, and mount the at least one module 360 based on the recreated uncompressed file 350 to perform the recovery operation.

In the electronic device 101 according to various embodiments, the processor 120 may store a designated value in a designated area of the memory 130 to notify that the recovery operation is performed corresponding to performing the recovery operation.

In the electronic device 101 according to various embodiments, the processor 120 may identify whether a hash value designated for the uncompressed file 350 matches a hash value generated for the uncompressed file 350, identify that corruption has occurred in the uncompressed file 350 corresponding to the hash values not matching, store a panic message in a designated node corresponding to the identification result, and identify that corruption has occurred in the uncompressed file 350 corresponding to identifying the stored panic message.

In the electronic device 101 according to various embodiments, the processor 120 may mount the at least one module 360 included in the uncompressed file 350, identify whether corruption has occurred in the uncompressed file 350 based on a signature check that identifies whether a signature designated for the mounted module 360 matches a signature of the mounted module 360, and identify that corruption has occurred in the compressed file 350 corresponding to the signatures not matching.

In the electronic device 101 according to various embodiments, the processor 120 may store a designated value in a designated area of the memory 130 corresponding to identifying that corruption has occurred in the uncompressed file 350 to notify information related to the corrupted uncompressed file 350.

In the electronic device 101 according to various embodiments, the processor 120 may reboot the electronic device 101 before a recovery operation of the uncompressed file 350.

In the electronic device 101 according to various embodiments, the processor 120 may perform a recovery operation of the uncompressed file 350 without rebooting the electronic device 101.

In the electronic device 101 according to various embodiments, the processor 120 may unmount the at least one mounted module 360 corresponding to identifying that corruption has occurred in the uncompressed file 350 and delete the corrupted uncompressed file 350 including the at least one unmounted module 360.

In the electronic device 101 according to various embodiments, the processor 120 may display information indicating completion of recovery on the display 160 corresponding to completing the recovery operation of the uncompressed file 350.

A method of operating the electronic device 101 according to various embodiments may include creating an uncompressed file 350 by decompressing a compressed file of a file that constitutes at least one module 360 into a package, storing the created compressed file 350 in the memory 130, identifying whether corruption has occurred in the uncompressed file 350 while booting the electronic device 101, and performing a recovery operation of the uncompressed file 350 corresponding to corruption occurring in the uncompressed file 350.

In the method of operating the electronic device 101 according to various embodiments, performing a recovery operation of the uncompressed file 350 may include deleting the uncompressed file 350 in which corruption has occurred, recreating an uncompressed file 350 by decompressing the compressed file 300 stored in the memory 130, and performing the recovery operation by mounting the at least one module 360 based on the recreated uncompressed file 350.

The method of operating the electronic device 101 according to various embodiments may include notifying that the recovery operation is performed by storing a designated value in a designated area of the memory 130 corresponding to performing the recovery operation.

In the method of operating the electronic device 101 according to various embodiments, identifying whether corruption has occurred in the uncompressed file 350 may include identifying whether a hash value designated for the uncompressed file 350 matches a hash value generated for the uncompressed file 350, identifying that corruption has occurred in the uncompressed file 350 corresponding to the hash values not matching, storing a panic message in a designated node corresponding to the identification result, and identifying that corruption has occurred in the uncompressed file 350 corresponding to identifying the stored panic message.

In the method of operating the electronic device 101 according to various embodiments, identifying whether corruption has occurred in the uncompressed file 350 may include mounting the at least one module 360 included in the uncompressed file 350, identifying whether corruption has occurred in the uncompressed file 350 based on a signature check that identifies whether a signature designated for the mounted module 360 matches a signature of the mounted module 360, and identifying that corruption has occurred in the uncompressed file 350 corresponding to the signatures not matching.

The method of operating the electronic device 101 according to various embodiments may include notifying information related to the corrupted uncompressed file 350 by storing a designated value in a designated area of the memory 130 corresponding to identifying that corruption has occurred in the uncompressed file 350.

The method of operating the electronic device 101 according to various embodiments may include rebooting the electronic device 101 before a recovery operation of the uncompressed file 350.

The method of operating the electronic device 101 according to various embodiments may include performing a recovery operation of the uncompressed file 350 without rebooting the electronic device 101.

The method of operating an electronic device 101 according to various embodiments may include unmounting the at least one mounted module 360 and deleting the corrupted uncompressed file 350 including the at least one unmounted module 360 corresponding to identifying that corruption has occurred in the uncompressed file 350.

The method of operating the electronic device 101 according to various embodiments may include displaying information indicating completion of recovery on the display 160 corresponding to completing the recovery operation of the uncompressed file 350. The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it denotes that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   at least one processor; and
   memory for storing a compressed file of a file that constitutes at least one module into a package, the memory comprising instructions that, when executed by the at least one processor individually or collectively, cause the electronic device to:
decompress the compressed file to create an uncompressed file,
store the uncompressed file in the memory,
mount the at least one module included in the uncompressed file,
in response to mounting the at least one module, identify whether corruption has occurred in the uncompressed file while booting the electronic device,
in response to identifying that the corruption has occurred in the uncompressed file while booting the electronic device, unmount the at least one module,
in response to unmounting the at least one module, delete the uncompressed file that is corrupted including the at least one module that is unmounted, based on identifying that the corruption has occurred in the uncompressed file,
decompress the compressed file stored in the memory to recreate another uncompressed file, and
perform a recovery operation of the uncompressed file corresponding to the corruption occurring in the uncompressed file by mounting the at least one module based on the another uncompressed file that is recreated.

2. The electronic device of claim 1, wherein the instructions that, when executed by the at least one processor, cause the electronic device to notify that the recovery operation is performed by storing a designated value in a designated area of the memory corresponding to performing the recovery operation.

3. The electronic device of claim 1, wherein the instructions that, when executed by the at least one processor, cause the electronic device to:
identify whether a hash value previously designated for the uncompressed file matches a hash value generated for the uncompressed file,
identify that the corruption has occurred in the uncompressed file based on the hash values not matching, and
store a panic message in a designated node.

4. The electronic device of claim 1, wherein the instructions that, when executed by the at least one processor, cause the electronic device to:
identify whether the corruption has occurred in the uncompressed file based on a signature check that identifies whether a signature previously designated for the module mounted matches a signature of the module mounted, and
identify that the corruption has occurred in the uncompressed file based on the signatures not matching.

5. The electronic device of claim 4, wherein the instructions, when executed by the processor, cause the electronic device to present a notification of information related to the uncompressed file that is corrupted by storing a designated value in a designated area of the memory corresponding to identifying that the corruption has occurred in the uncompressed file.

6. The electronic device of claim 4, wherein the instructions that, when executed by the at least one processor, cause the electronic device to reboot the electronic device before the recovery operation of the uncompressed file.

7. The electronic device of claim 4, wherein the instructions, when executed by the processor, cause the electronic device to perform the recovery operation of the uncompressed file without rebooting the electronic device.

8. The electronic device of claim 1, wherein the instructions that, when executed by the at least one processor, cause the electronic device to display information indicating completion of recovery on the display corresponding to completing the recovery operation of the uncompressed file.

9. A method of operating an electronic device, the method comprising:
creating an uncompressed file by decompressing a compressed file of a file that constitutes at least one module into a package;
storing the uncompressed file in memory of the electronic device;
mounting the at least one module included in the uncompressed file;
in response to mounting the at least one module, identifying whether corruption has occurred in the uncompressed file while booting the electronic device;
in response to identifying that the corruption has occurred in the uncompressed file while booting the electronic device, unmounting the at least one module;
in response to unmounting the at least one module, deleting the uncompressed file that is corrupted including the at least one module that is unmounted, based on identifying that the corruption has occurred in the uncompressed file;
decompressing the compressed file stored in the memory to recreate another uncompressed file; and
performing a recovery operation of the uncompressed file corresponding to the corruption occurring in the uncompressed file by mounting the at least one module based on the another uncompressed file that is recreated.

10. The method of claim 9, further comprising notifying that the recovery operation is performed by storing a designated value in a designated area of the memory corresponding to performing the recovery operation.

11. The method of claim 9, wherein identifying whether the corruption has occurred in the uncompressed file comprises:
identifying whether a hash value previously designated for the uncompressed file matches a hash value generated for the uncompressed file;
identifying that the corruption has occurred in the uncompressed file based on the hash values not matching, and
storing a panic message in a designated node.

12. The method of claim 9, wherein identifying whether corruption has occurred in the uncompressed file comprises:
identifying whether the corruption has occurred in the uncompressed file based on a signature check that identifies whether a signature previously designated for the module mounted matches a signature of the module mounted; and
identifying that the corruption has occurred in the uncompressed file corresponding to the signatures not matching.

* * * * *